United States Patent
Mazahreh et al.

(10) Patent No.: US 8,620,984 B2
(45) Date of Patent: Dec. 31, 2013

(54) MINIMUM MEAN SQUARE ERROR PROCESSING

(75) Inventors: Raied N. Mazahreh, Cottonwood Heights, UT (US); Hai-Jo Tarn, San Jose, CA (US); Raghavendar M. Rao, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 814 days.

(21) Appl. No.: 12/623,656

(22) Filed: Nov. 23, 2009

(65) Prior Publication Data

US 2011/0125819 A1 May 26, 2011

(51) Int. Cl.
G06F 7/32 (2006.01)
G06F 17/10 (2006.01)

(52) U.S. Cl.
USPC .............................. 708/522; 708/520; 708/323

(58) Field of Classification Search
USPC .................. 708/308, 322, 520, 607, 323, 522
See application file for complete search history.

(56) References Cited

U.S. PATENT DOCUMENTS

| | | |
|---|---|---|
| 4,727,503 A | 2/1988 | McWhirter |
| 4,777,614 A | 10/1988 | Ward |
| 4,823,299 A | 4/1989 | Chang et al. |
| 5,018,065 A | 5/1991 | McWhirter et al. |
| 5,323,335 A | 6/1994 | Mitchell |
| 5,475,793 A | 12/1995 | Broomhead et al. |
| 6,675,187 B1 | 1/2004 | Greenberger |
| 7,069,372 B1 | 6/2006 | Leung et al. |
| 7,120,658 B2 | 10/2006 | Nash |
| 7,489,746 B1 | 2/2009 | Awater et al. |
| 7,606,207 B2 * | 10/2009 | Becker et al. ................. 370/335 |
| 7,685,219 B2 | 3/2010 | Li |
| 7,933,353 B2 | 4/2011 | Maltsev et al. |
| 8,190,549 B2 | 5/2012 | Yang et al. |
| 2003/0018675 A1 | 1/2003 | Asai et al. |
| 2004/0071207 A1 | 4/2004 | Skidmore et al. |
| 2008/0028015 A1 * | 1/2008 | Seki .............................. 708/522 |
| 2009/0110120 A1 | 4/2009 | Mcnamara et al. |
| 2009/0116588 A1 | 5/2009 | McNamara et al. |
| 2009/0310656 A1 | 12/2009 | Maltsev et al. |
| 2011/0125819 A1 | 5/2011 | Mazahreh et al. |
| 2011/0264721 A1 | 10/2011 | Patel et al. |

OTHER PUBLICATIONS

Ma, Lei et al., "Modified Givens Rotations and Their Application to Matrix Inversion," *Proc. of the International Conference on Acoustics, Speech and Signal Processing (ICASSP 2008)*, Mar. 31, 2008, pp. 1437-1440, IEEE, Piscataway, New Jersey, USA.

(Continued)

*Primary Examiner* — Chuong D Ngo
(74) *Attorney, Agent, or Firm* — LeRoy D. Maunu; Lois D. Cartier

(57) ABSTRACT

A first systolic array receives an input set of time division multiplexed matrices from a plurality of channel matrices. In a first mode, the first systolic array performs triangularization on the input matrices, producing a first set of matrices, and in a second mode performs back-substitution on the first set, producing a second set of matrices. In a first mode, a second systolic array performs left multiplication on the second set of matrices with the input set of matrices, producing a third set of matrices. In a second mode, the second systolic array performs cross diagonal transposition on the third set of matrices, producing a fourth set of matrices, and performs right multiplication on the second set of matrices with the fourth set of matrices. The first systolic array switches from the first mode to the second mode after the triangularization, and the second systolic array switches from the first mode to the second mode after the left multiplication.

20 Claims, 12 Drawing Sheets

(56) References Cited

OTHER PUBLICATIONS

Kim, Hun Seok et al., "A Practical, Hardware Friendly MMSE Detector for MIMO-OFDM-Based Systems," *EURASIP Journal on Advances in Signal Processing*, Jan. 2008, pp. 1-14, Hindawi Publishing Corp., New York, New York, USA.

Altera Corp., *QR Matrix Decomposition*, Application Note AN-506-2.0, Feb. 2008, pp. 1-55, Altera Corporation, San Jose, California, USA.

Boher, Laurent et al., "Analysis of CORDIC-based Triangularization for MIMO MMSE Filtering," *Proc. of the 2008 IEEE International Symposium on Circuits and Systems (ISCAS 2008)* May 18, 2008, pp. 948-951, IEEE, Piscataway, New Jersey, USA.

Laroche, Isabelle et al., "An Efficient VLSI Architecture of a Layered Space-Time Receiver," *Proc. of the IEEE 65$^{th}$ Vehicular Technology Conference*, Apr. 1, 2007, pp. 387-391, IEEE, Piscataway, New Jersey, USA.

U.S. Appl. No. 12/522,171, filed Sep. 1, 2009, Rao et al.

U.S. Appl. No. 12/522,174, filed Sep. 1, 2009, Raghavendar et al.

U.S. Appl. No. 12/522,178, filed Sep. 1, 2009, Raghavendar et al.

U.S. Appl. No. 12/522,180, filed Sep. 1, 2009, Raghavendar et al.

U.S. Appl. No. 12/623,624, filed Nov. 23, 2009, Tarn et al.

Böhnke, Ronald et al., "Reduced Complexity MMSE Detection for BLAST Architectures," *Proc. of the 2003 IEEE Global Telecommunications Conference*, Dec. 1, 2003, pp. 2258-2262, vol. 4, IEEE, Piscataway, New Jersey, USA.

Edman, Fredrik, *Digital Hardware Aspects of Multiantenna Algorithms*, PhD thesis, 2006, pp. 98, Lund University, Department of Electroscience, Lund, Sweden.

Edman, Fredrik et al., "A Scalable Pipelined Complex Valued Matrix Inversion Architecture," *Proc. of the 2005 IEEE International Symposium on Circuits and Systems*, May 23, 2005, vol. 5, IEEE, Piscataway, New Jersey, USA.

El-Amawy, A. et al., "Parallel VLSI algorithm for stable inversion of dense matrices," *IEE Proceedings-E Computer and Digital Techniques*, Nov. 1989, pp. 575-580, vol. 136, Issue 6, IEEE, Piscataway, New Jersey, USA.

Gentleman, W. M. et al., "Matrix triangularization by systolic arrays," *Proc. SPIE Symposium on Real-Time Signal Processing IV*, Aug. 1981, pp. 19-26, vol. 298.

Haller, B. et al., "Efficient Implementation of Rotation Operations for High Performance QRD-RLS Filtering," *Proc. of the 1997 IEEE International Conference on Application-Specific Systems, Architectures and Processors*, Jul. 14, 1997, pp. 162-174, IEEE, Piscataway, New Jersey, USA.

Hassibi, Babak, "An Efficient Square-Root Algorithm for BLAST," *Proc. of the 2000 IEEE International Conference on Acoustics, Speech and Signal Processing*, Jun. 5, 2000, pp. 737-740, vol. 2, IEEE, Piscataway, New Jersey, USA.

Haykin, Simon, *Adaptive Filter Theory*, 2002, pp. 838-841, Appendix F, Prentice Hall, Upper Saddle River, New Jersey, USA.

Hemkumar, Nariankadu, "Efficient Complex Matrix Transformations with CORDIC," *Proc. of the 1993 IEEE 11$^{th}$ Symposium on Computer Arithmetic*, Jun. 29, 1993, pp. 122-129, IEEE, Piscataway, New Jersey, USA.

Hemkumar, Nariankadu D., *A Systolic VLSI Architecture for Complex SVD*, MS Thesis, May 1991, pp. 1-122, Rice University, Department of Electrical and Computer Engineering, Houston, Texas.

Karkooti, Marjan et al., "FPGA Implementation of Matrix Inversion Using QRD-RLS Algorithm," *Conference Record of the 39$^{th}$ Asilomar Conference on Signals, Systems and Computers*, Oct. 28, 2005, pp. 1625-1629, IEEE, Piscataway, New Jersey, USA.

Kim, Hun Seok et al., "A Practical, Hardware Friendly MMSE Detector for MIMO-OFDM-Based Systems," *EURASIP Journal on Advances in Signal Processing*, 2008, pp. 1-14, vol. 2008, Hindawi Publishing Corp., New York, New York, USA.

Sayed, Ali, *Fundamentals of Adaptive Filtering*, 2003, pp. 804-807, Section 12.A.1, John Wiley & Sons, Inc., Hoboken, New Jersey, USA.

U.S. Appl. No. 12/814,319, filed Jun. 11, 2010, Rao et al.

U.S. Appl. No. 12/839,198, filed Jul. 19, 2010, Rao.

Bellis, S. J. et al., "Alternative systolic array for non-square-root Cholesky decomposition," *IEEE Proc.-Comput. Digit. Tech.*, Mar. 1997, pp. 57-64, vol. 144, No. 2, IEEE, Piscataway, New Jersey, USA.

Brent, Richard P., *Computing the Cholesky Factorization Using a Systolic Architecture*, Sep. 1982, pp. 1-15, TR 82-521, Cornell University, Department of Computer Science, Ithaca, New York, USA.

Porta, Tiba, *A Programmable Systolic Array for Factorial Data Analysis Part I: Matrix Computations*, Jun. 1987, pp. 1-17, Research Report YALEU/DCS/RR-542, Yale University, Department of Computer Science, New Haven, Connecticut, USA.

Salmela, Perttu et al., "DSP Implementation of Cholesky Decomposition," *Proc. of the 2006 Joint IST Workshop and Symposium on Trends in Communications (sympoTIC '06)*, Jun. 27, 2006, pp. 6-9, IEEE, Piscataway, New Jersey, USA.

Wyrzykowski, R. et al., "One-dimensional processor arrays for linear algebraic problems," *IEEE Proc.-Comput. Digit. Tech.*, Jan. 1995, pp. 1-4, vol. 142, No. 1, IEEE, Piscataway, New Jersey, USA.

Yang, Depeng et al., "An FPGA Implementation for Solving Least Square Problem," *Proc. of the 2009 17$^{th}$ IEEE Symposium on Field Programmable Custom Computing Machines*, Apr. 5, 2009, pp. 303-306, IEEE Computer Society, Washington, DC, USA.

Omidi, Mohammmad Javad et al., "Parallel Structures for Joint Channel Estimation and Data Detection over Fading Channels," *IEEE Journal on Selected Areas in Communications*, Dec. 1998, pp. 1616-1629, vol. 16, No. 9, IEEE, Piscataway, New Jersey, USA.

* cited by examiner

MINIMUM MEAN SQUARE ERROR PROCESSING

FIELD OF THE INVENTION

The present invention generally relates to communication to multiple input antennas from multiple output (MIMO) antennas.

BACKGROUND

Data can be transmitted electromagnetically between a transmitting and a receiving antenna. The transmitter encodes the data into a sequence of symbols selected from a symbol constellation. The transmitting antenna transmits the symbols and the receiving antenna detects the symbols.

Interference from noise and reflections may corrupt the symbols received by the receiving antenna. For a maximum-likelihood detector, the receiver can compare the received signal with the expected received signal for all of the symbols in the constellation. The expected received signal that most closely matches the actual received signal provides the detected symbol.

A measurement of the characteristics of the communication medium helps proper symbol detection. In one example, the transmitter periodically transmits a known pattern of symbols to the receiver and the receiver uses the known pattern to determine the characteristics, such as multiple signal propagation paths, of the communication medium.

The data transfer rate of electromagnetic communication is increased by transmitting multiple symbols in parallel from multiple transmitting antennas. The detection of the multiple transmitted symbols improves by receiving the symbols with multiple receiving antennas. For maximum-likelihood detection with multiple transmitting antennas, the number of possible combinations of symbols transmitted in parallel is the degree of the constellation raised to the power of the number of transmitting antennas. Evaluation of all possible combinations is infeasible for higher order modulation and a large number of antennas.

The present invention may address one or more of the above issues.

SUMMARY

In one embodiment of the present invention, a minimum mean square error equalization circuit arrangement is provided. The circuit arrangement includes a first systolic array configured to operate in first and second modes and receive an input set of time division multiplexed matrices from a plurality of channel matrices. The first systolic array operating in the first mode performs triangularization on the input set of matrices to produce a first set of time division multiplexed output matrices, and operating in the second mode performs back-substitution on the first set to produce and output a second set of time division multiplexed output matrices.

The circuit arrangement further includes a second systolic array configured to operate in first and second modes and receive the second set of matrices from the first systolic array and the input set of matrices. (Note that the first and second modes of the second systolic array are distinct from the first and second modes of the first systolic array.) The second systolic array operating in the first mode performs left multiplication on the second set of matrices with the input set of matrices to produce a third set of time division multiplexed output matrices. The second systolic array operating in the second mode performs cross diagonal transposition on the third set of matrices to produce a fourth set of time division multiplexed output matrices and performs right multiplication on the second set of matrices with the fourth set of matrices to produce a fifth set of time division multiplexed output matrices. A set of outputs of the first systolic array is coupled to a first set of corresponding inputs of the second systolic array. The first systolic array is configured to switch from the first mode to the second mode after triangularization is completed, and the second systolic array is configured to switch from the first mode to the second mode after left multiplication is completed.

In another embodiment of the invention, a systolic array is provided for performing triangularization and back-substitution. The systolic array includes a plurality of processing cells, including boundary cells and internal cells, and arranged into N rows of processing cells, defined as rows 1 through N, each row M beginning with a boundary processing cell and continuing with a number of internal processing cells equal to the number N minus M. The array is also arranged into N columns of processing cells, defined as columns 1 through N, each column L containing L minus one internal processing cell followed by one boundary processing cell. The systolic array is configurable to receive and process time division multiplexed input of elements of a plurality of channel matrices. The processing cells are configurable to operate in a first mode and a second mode.

While operating in the first mode, the boundary cells determine and output first and second rotation factors to the next processing cell in the row occupied by the boundary cell for each input element corresponding to a channel matrix in the plurality of channel matrices. While operating in the first mode, the boundary cells further determine the multiplicative inverse of an accumulated value of the squared magnitude of the input elements corresponding to each channel matrix. While operating in the second mode the boundary cells: output a first rotation factor equal to a value of one; and output a second rotation factor equal to the multiplicative inverse multiplied by the input element.

The internal processing cells are configured to receive and output first and second rotation factors and, for each input element corresponding to a channel matrix in the plurality of channel matrices, determine and store a first value equal to the input element multiplied by the second rotation factor and added to the first rotation factors multiplied by a stored first value of the preceding input element corresponding to the channel matrix. The internal processing cells are further configured to, for each input element corresponding to a channel matrix in the plurality of channel matrices, multiply the first value by the second rotation factor to produce a second value and multiply the input element by the first rotation factor to produce a third value. While operating in the first mode, the internal cells output the third value added to the second value. While operating in the second mode, the internal cells output the second value subtracted from the third value.

In yet another embodiment, a systolic array for right multiplication, left multiplication, and cross diagonal transposition is provided. The systolic array includes a plurality of processing cells, including boundary cells and internal cells, and arranged into N rows of processing cells, defined as rows 1 through N, each row M beginning with a boundary processing cell and continuing with a number of internal processing cells equal to the number N minus M. The array is also arranged into N columns of processing cells, defined as columns 1 through N, each column L containing L minus one internal processing cell followed by one boundary processing cell. The systolic array is configurable to receive and process time division multiplexed input of elements of a plurality of channel matrices. The processing cells are configurable to operate in a first mode and a second mode.

While operating in the first mode, processing cells of the systolic array are configured and interconnected to receive a first and second input matrices and perform left multiplication of the first input matrix with the second input matrix to produce a first output matrix. While operating in the second mode, processing cells of the systolic array are configured and interconnected to perform cross diagonal transposition on the first output matrix and perform right multiplication of the cross diagonal transposition of the first output matrix with the first input matrix to produce a second output matrix.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which:

FIG. 3-1 shows a boundary cell of a systolic array for performing triangularization;

FIG. 3-2 shows an internal cell of a systolic array for performing triangularization;

DETAILED DESCRIPTION

In multiple input multiple output (MIMO) systems multiple (M) transmitting antennas transmit respective symbols in parallel to multiple (N) receiving antennas. Each of the receiving antennas receives a weighted sum of the respective symbols transmitted from the transmitting antennas. Various algorithms exist to decode or separate the symbols transmitted by each transmitting antenna. In the decoding calculation, a systolic array can be used to increase streaming throughput.

A systolic array is an interconnected matrix of individual signal processing units, or "cells," where the cells process individual elements of an input matrix and exchange processed output to perform an overall operation. However, in the context of MIMO decoding using present algorithms, systolic arrays are subject to a dependency between sequentially streamed inputs—the processing of one element is dependent on the calculated value of the previously processed element. Thus, an input element cannot be processed until the processing of the preceding element is completed.

The present invention improves throughput in a systolic array-implemented MIMO decoder by grouping input elements of non-dependent matrices such that non-dependent elements are processed in between dependent elements of an input matrix. In this manner, input elements can be input and processed by a processing cell before processing of the preceding element has completed. The present invention further improves throughput in a systolic array-implemented MIMO decoder by implementing the MIMO decoder using two systolic arrays: one for triangularization and back-substitution; and a second for performing right and left multiplications and cross diagonal transposition. By implementing the decoding functions using two arrays, triangularization can begin on a set of grouped inputs as soon as back-substitution of the preceding set of grouped inputs has completed.

Figure 1:
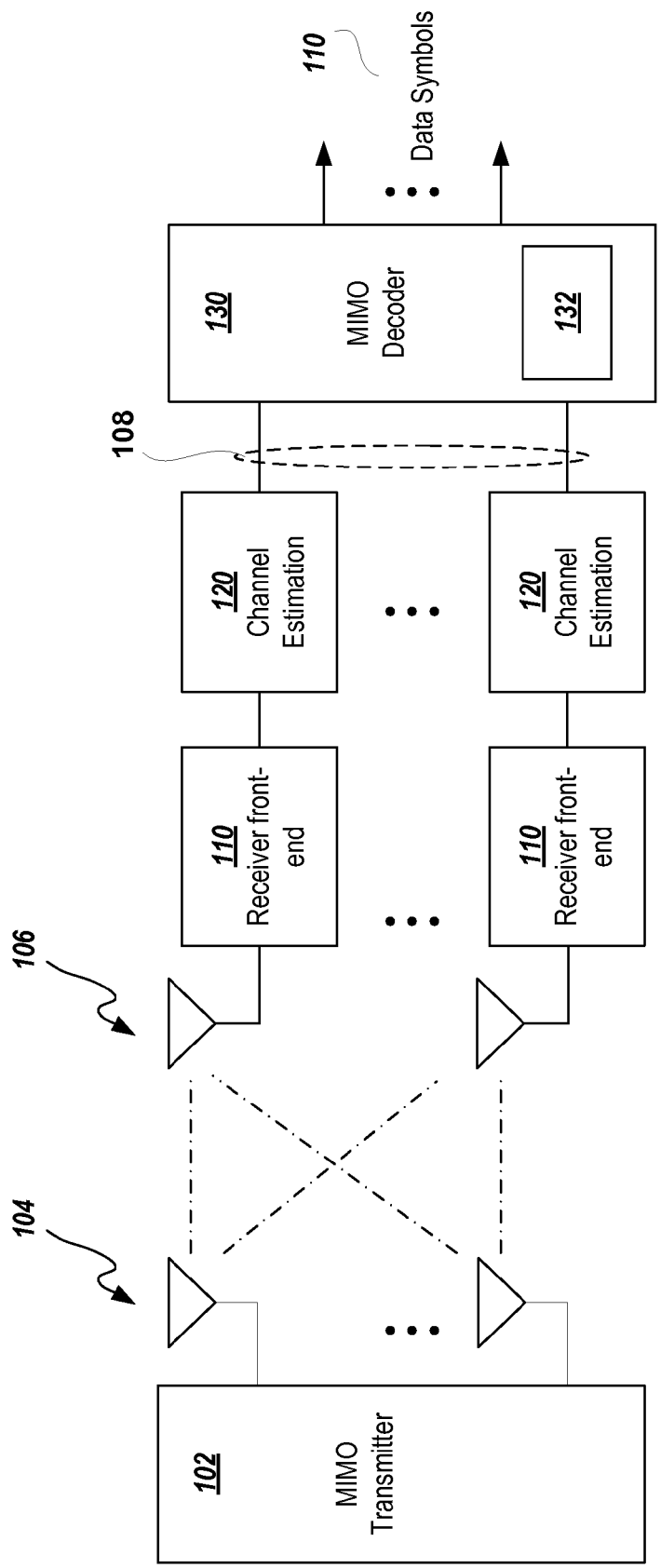
FIG. 1 is a block diagram depicting an exemplary embodiment of a MIMO communication system.

FIG. 1 is a block diagram depicting an exemplary embodiment of a MIMO communication system. MIMO transmitter has multiple antennas 104, each of which transmits a different set of symbols in parallel. Antennas 106 receive signals respectively for receiver front-ends 110. Outputs of receiver front-ends 110 are respectively provided to channel estimation circuits 120. Outputs 108 from channel estimation circuits are provided to MIMO decoder 130. MIMO decoder 130 includes complex Givens rotation block 132. MIMO decoder 130 outputs decoded data symbols 110.

A model for the communication channel between the M transmitting antennas and the N receiving antennas is:

$$y=Hx+n$$

where H is an N×M channel matrix between the N receiving antennas and the M transmitting antennas, x is a column vector of M symbols transmitted from the transmitting antennas, n is a column vector of N received noise elements, and y is a column vector of N signals received at the receiving antennas. Each of the M transmitted symbols in column vector x is a symbol from a constellation having an order of w symbols.

An estimate $\hat{x}$ of the transmitted symbols can be computed by finding a weight matrix W that can multiply the received signal vector y. The weight matrix W can be computed using the minimum mean square error (MMSE) of inverse of H. The MMSE solution is given by, $$W=(H^H H+\sigma^2/I_{nT})^{-1}H^H$$

The MMSE solution above requires the generation of the $H^H H$ matrix. In various solutions the $H^H H$ multiplication can be avoided by using an extended channel matrix defined as, $$\underline{H} = \begin{bmatrix} H_{nRxnT} \\ \sigma I_{nT} \end{bmatrix} \text{ and }$$

$$\underline{y} = \begin{bmatrix} y_{nRx1} \\ 0_{nT} \end{bmatrix}$$

The estimate $\hat{x}$ is defined in terms of the extended channel matrix as, $$\hat{x}=W\underline{y}=(\underline{H}^H\underline{H})^{-1}\underline{H}^H\underline{y}=\underline{H}^\dagger \underline{y}$$

Both solutions require a matrix inverse of the H matrix. This is accomplished through QR decomposition as follows, $$H = QR$$

$$H^\dagger = R^{-1} Q^H$$

In the case of the extended channel matrix solution the QR decomposition of the extended matrix can be expressed as, $$\underline{H} = \begin{bmatrix} H \\ \sigma I_{n_T} \end{bmatrix}$$

$$= \underline{Q}_{(n_T+n_R) \times (n_T+n_R)} R_{(n_T+n_R) \times n_T}$$

$$= \begin{bmatrix} Q_{1(n_R \times (n_T + n_R))} \\ Q_{2(n_T \times (n_T + n_R))} \end{bmatrix} \underline{R}$$

By equating the lower block the following solution is obtained, $$\sigma I_{n_T} = Q_2 \underline{R} \Rightarrow \underline{R}^{-1} = \frac{1}{\sigma} Q_2$$

With this solution the estimate $\hat{x}$ can be expressed as, $$\hat{x} = \underline{H}^\dagger \underline{y}$$

$$= \underline{R}^{-1} [Q_1^H \quad Q_2^H] \underline{y}$$

$$= \frac{1}{\sigma} Q_2 Q_1^H \underline{y}$$

$$= \underline{R}^{-1} Q_1^H \underline{y}$$

where, $$W = \underline{R}^{-1} Q_1^H$$

$Q_1$ can be calculated by equating the upper block matrix as, $$H = Q_1 \underline{R} \Rightarrow Q_1 = H \underline{R}^{-1}$$

The calculation of the weight matrix through MMSE QR decomposition can be implemented using one or more systolic arrays. A systolic array is an interconnected matrix of individual signal processing units or cells, where overall operation of the systolic array depends upon functions of the individual signal processing cells and the interconnection scheme of such signal processing cells. A clock signal may be applied to a systolic array to control data flow through each cell. Alternately, operations of an individual cell may be triggered by the arrival of input data objects.

The interconnection scheme of some systolic arrays may include interconnects only between nearest neighbor signal processing cells within a systolic array. However, interconnection schemes are not limited to having only nearest neighbor interconnects.

In matrix processing operations, matrix elements are passed between cells according to element relationship and the function to be performed. For example, matrix multiplication is performed by inputting one row of the matrix at a time from the top of the array, which is passed down the array. The other matrix is input one column at a time from the left hand side of the array and passes from left to right. When each cell has processed one whole row and one whole column, the result of the multiplication is stored in the array and can now be output a row or a column at a time, flowing across or down the array.

The systolic array implementation of the MMSE calculation is advantageous because it is easily scalable as the number of antenna channels used increases. To calculate MMSE in a systolic array, the extended channel matrix $\overline{H}$ is decomposed into a triangular matrix R. The triangularized matrix R is inverted using back-substitution within the systolic array to generate $R^{-1}$. The $Q_1$ matrix is then generated by left multiplication of the original channel matrix H with $R^{-1}$. $Q_1'$, the hermitian matrix of $Q_1$ is generated by some special circuitry and wiring between output and input of the systolic array. The weight matrix W is then generated by right multiplying $Q_1'$ with $R^{-1}$. An estimate $\hat{x}$ is then computed by multiplying weight matrix W with received signal vector y.

The systolic array cells may be configured to operate in different modes to perform each function of the MMSE calculation. As such, some systolic array configurations will implement all functions of the MMSE calculation within a single systolic array with a different mode for each function to be performed. Alternately, the various functions of the MMSE calculation may be performed by separate systolic arrays, where the output matrix of one array is passed as input to the next.

Figure 2:
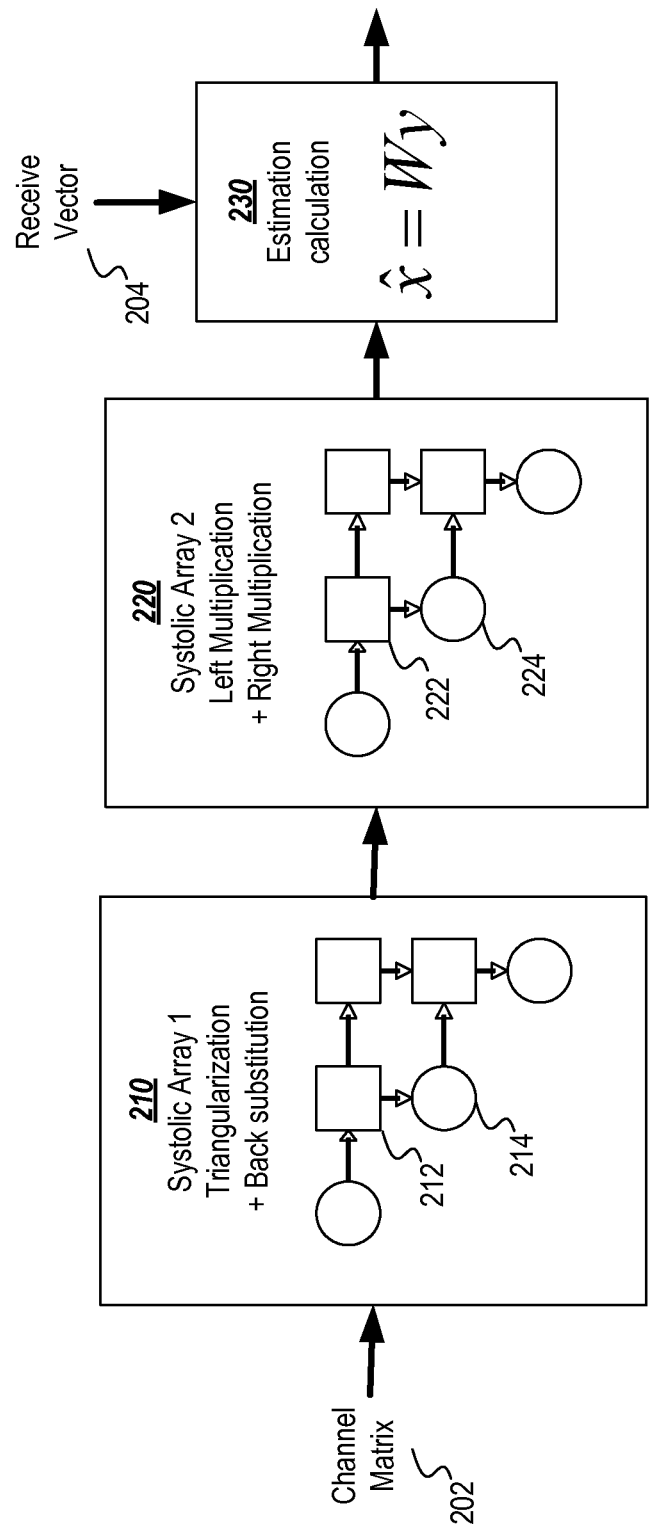
FIG. 2 shows a block diagram of two systolic arrays configured to perform MMSE calculations.

FIG. 2 shows a block diagram of two systolic arrays configured to perform the MMSE calculation. In this example implementation, the processes of the calculation are split between two systolic arrays. A first systolic array 210 is configured to receive channel matrix 202 and perform triangularization and back-substitution. The output of systolic array 210 is provided to a second systolic array 220, which is configured to perform right and left multiplication operations. The output systolic array 230 is multiplied by receive vector 204 in channel estimator 230 to produce an estimation of the received channels. The systolic arrays 210 and 220 include respective boundary cells 214 and 224 and internal cells 212 and 222. Implementation of the boundary cells is different from the internal cells. Boundary cells are configured to calculate initial values that are passed on to and/or updated by the internal cells. For example, in triangularization, the boundary cells are configured to calculate rotations factors which are passed through and applied by the internal cells.

Systolic arrays are advantageous in that they are fast and scale easily as the number of MIMO antennas in increased. However, systolic arrays are subject to an inherent latency due to dependency between sequential matrix elements in several of the functions of the MMSE calculation. For example, in performing triangularization of the extended channel matrix, a matrix element in a processing cell is dependent on the calculated value of the preceding element of the matrix. Thus, each element of a matrix column or row cannot be processed until the processing of the preceding element is completed.

Figures 1, 3:
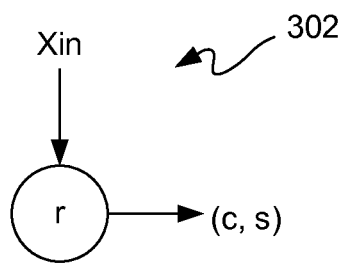
Figures 2, 3:
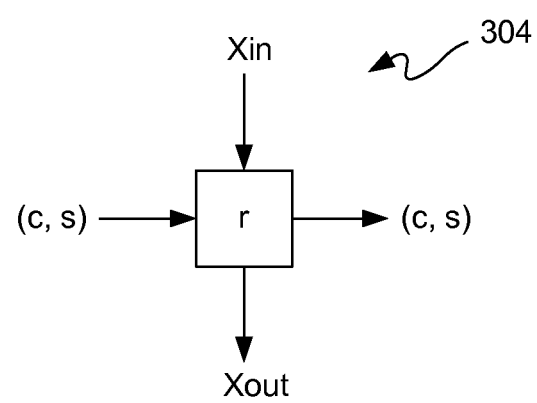

FIGS. 3-1 and 3-2 show block diagrams of cells for performing triangularization in a systolic array. FIG. 3-1 shows a boundary cell for performing triangularization. Boundary cell 302 computes rotation factors c and s which are passed on to the neighboring internal cell. The rotation factors are initially c=1 and s=0 which are then computed based on input received and an accumulated value from previous c and s calculations. The c and s calculation is given by, $$r_{new} = \sqrt{r_{old}^2 + x^2}$$

$$c = \frac{r_{old}}{r_{new}}$$

$$s = \frac{x}{r_{new}}$$

Rotation factors are calculated and updated as each element of the matrix is input to and processed by each cell. In calculating rotation factors c and s, the value of $r_{new}$ is dependent on the value of $r_{old}$ which is calculated from previously processed elements of the channel matrix.

FIG. 3-2 shows an internal cell for performing triangularization. Internal cell 304 consists of two multipliers at the input of an accumulator followed by shift register (not shown). Internal cell 304 applies rotations c and s computed in the preceding cell to the other columns of the input matrix. The inputs c and s receive the rotation factors from the boundary cell or from a preceding internal cell. These rotation factors are applied to the input element x and are passed along to the neighboring internal cells. Output x is calculated with c and s rotation factors and an accumulated value from calculations of previous input. The c and s rotation factors are then passed to the next internal cell in the array. The calculation of output x is given by, $$X_{out} = -s \cdot r + c \cdot X_{in}$$

$$r(\text{new}) = c^* \cdot r + s^* \cdot X_{in}$$

In calculating the value of $X_{out}$, the value of $r_{new}$ is dependent on the value of $r_{old}$ which is calculated from previously processed elements of the channel matrix.

Because the operations performed by the internal and boundary cells are dependent on the accumulated values determined from previous input values, an element of a channel matrix cannot be input until the elements upon which it is dependant have been processed. For example, in hardware, the complex multiplication performed by the internal cell takes at least four clock cycles. In previous implementations of systolic arrays, input to the systolic array is halted until the updated c and s values are calculated—creating a bottleneck of the algorithm and lengthening the streaming latency.

The present invention improves throughput of the systolic array by processing non-dependent input from different channel matrices elements in between processing of dependent channel matrix elements. In this manner, an element can be input and processed by a processing cell before processing of the preceding element has completed.

The systolic array of FIG. 2 and processing cell implementation of FIGS. 3-1 and 3-2 are described for exemplary purposes. It is understood that the present invention is applicable to other systolic arrays implementing the MMSE as well as other estimation algorithms with inherent dependency between sequential input elements such as zero-forcing or other linear MIMO decoding algorithms. The dependency is broken by grouping elements of several channel matrices corresponding to several sub-carriers. Sub-carriers are utilized in several MIMO systems. For example, the 3GPP-LTE system uses carrier bands of 20 Mhz which is split into 100 resource blocks of 180 kHz. Each resource block contains 12 subcarriers with a spacing in the frequency domain of 15 kHz. The embodiments of the present invention place symbols received from each subcarrier into a separate channel matrix and groups elements of the sub-carrier matrices that are of the same row and column index. The sub-carrier grouping minimizes the overall streaming latency of the processing cells.

The subcarriers enter the MIMO decoder system serially, in a time division multiplexed fashion. Therefore, the non-dependant data from the sub-carriers can be formed into a group to shorten the streaming latency and increase the system throughput. For example, in a system where two subcarriers, A and B, are used in a 2×2 MIMO system, inputs streamed into the systolic array would be $H_{A11}$, $H_{B11}$, $H_{A12}$, $H_{B12}$, corresponding to the first row of the channel matrix, and $H_{A21}$, $H_{B21}$, $H_{A22}$, $H_{B22}$, corresponding to the second row of the channel matrix. In this example $H_{A12}$ is the channel matrix element of subcarrier A at row index 1 and column index 2 and $H_{B12}$ is the channel matrix of subcarrier B at row index 1 and column index 2.

As the grouped or interleaved input is streamed through the systolic array, each processing cell must store dependency variables until the next dependent element is input. In the two subcarrier example above, rotation factors calculated from $H_{A11}$ must be stored until dependent element $H_{A12}$ is received as input. One method of storage of the rotation factors of each subcarrier is the use of shift registers. Using the boundary cell of FIG. 3-1 as an example, the boundary cells consist of a magnitude squared ($|x|^2$) module, followed by an accumulator and a shift register. The shift register must be deep enough to process and store a variable for each of the subcarriers. In the optimal situation the number of subcarriers is chosen to be greater than the length of the processing delay of the processing cell with the longest delay. In this manner, internal processing stages of each cell are simultaneously utilized. As discussed above, the complex multiplication of the internal cell of FIG. 3-2 takes four clock cycles, so in 3GPP-LTE, grouping of 12 sub-carriers is an optimal grouping.

For illustration purposes, the following examples show the operation of a systolic array with grouping of two subcarriers. It is understood that any number of subcarriers may be used in accordance with various embodiments of the invention.

Figure 4:
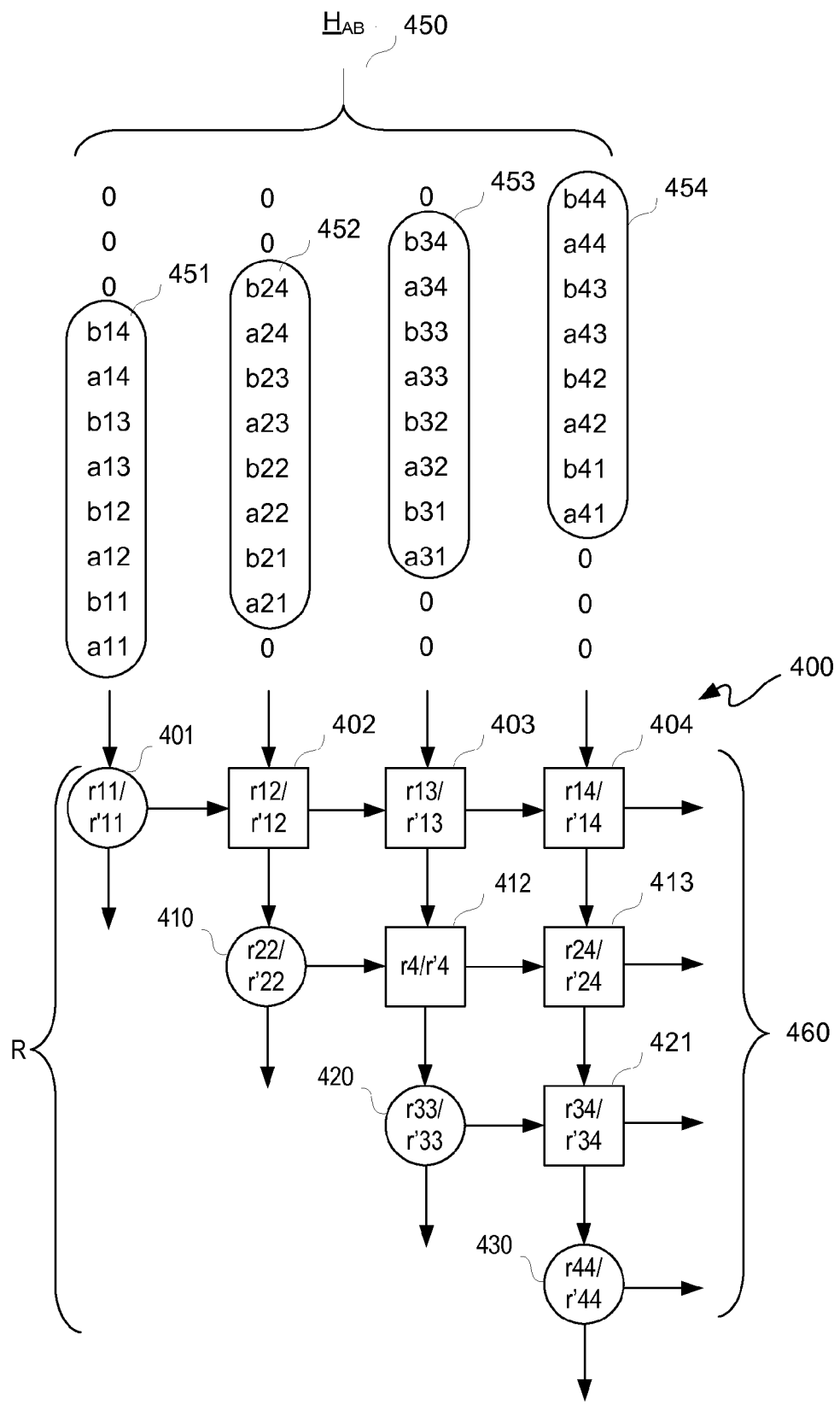
FIG. 4 shows as example systolic array configured to perform triangularization with time division multiplexed input from a plurality of subcarriers.

FIG. 4 shows an example systolic array configured to perform triangularization with grouped subcarrier input. Extended channel matrix $H_{AB}$ 450 shows how subcarriers are grouped as input to systolic array 400. Some embodiments of the invention refer to grouped matrices as interleaved and such terms are used interchangeably herein. Grouped extended channel matrix $H_{AB}$ contains four rows 451, 452, 453, and 454 oriented in a vertical direction for input. Grouped extended channel matrix $H_{AB}$ is serially input into the systolic array, in that elements of subcarrier A and B in a row are received by the same systolic array input and are processed by the same cells. Because variables used in the calculation are maintained in separate registers for each channel matrix, serially processed elements of subcarrier A and B can be processed independently by the same processing cells without interfering with the R calculation of the other.

A first row 451 of matrix $H_{AB}$ is clocked into an upper leftmost boundary cell 401. A second row 452 of matrix $H_{AB}$ is clocked into internal cell 402, and a third row 453 of matrix $H_{AB}$ is clocked into internal cell 403. Lastly, for the depicted example embodiment, a fourth row 454 of matrix $H_{AB}$ is clocked into internal cell 404. Each row has elements of subcarriers A and B grouped according to column indices, with elements of subcarrier A at row i and column j denoted as $a_{ij}$ and elements of subcarrier B at row i column j denoted as $b_{ij}$.

Due to clock delays, zero padding is used for the calculations to be performed directly. Accordingly, a first input row 401 for input of matrix $H_{AB}$ is H1, 0, 0, 0 as respectively input to cells 401 through 404. Furthermore, a second input row 402 for input of matrix $H_{AB}$ includes values 0, H2, 0, 0, respectively input to cells 401 through 404. A third input row 403 for input of matrix $H_{AB}$ is 0, 0, H3, 0 as respectively input to cells 401 through 404. A fourth input row 404 for input of matrix $H_{AB}$ does not include any zero padding in the depicted exemplary embodiment; however, input rows after row 404 do include zero padding in the depicted exemplary embodiment. Accordingly, rows 451 through 454 of matrix $H_{AB}$ may be input as staggered with zero padding for multiplication As $H_{AB}$ is input, triangularization is performed, leaving each cell with trained register values containing matrix R corresponding to channel matrix $H_A$ and R' corresponding to channel matrix $H_B$. On the right side of systolic array 400 output 460 may be obtained.

Subcarrier grouping of input is similarly performed if the systolic array is configured to operate in different modes and perform further operations of the MMSE calculation. For example, if the systolic array is configured to perform back-substitution in addition to triangularization, each cell will switch to a back-substitution mode following triangularization, and would use the stored R and R' values to perform the inversion operation. After back-substitution each cell would be trained to contain $R^{-1}$ and $R'^{-1}$ values. Interleaved matrix $R_{AB}^{-1}$ would be shifted to outputs 460 on the right side of systolic array 400. Alternately, if the systolic array were configured to operate in yet another mode to perform the left multiplication operation, the trained values, $R^{-1}$ and $R'^{-1}$, would not be shifted to output but would be maintained within each cell to perform the left multiplication operation. In some embodiments, the trained stored values in a systolic array are referred to as residues and such terms are used interchangeably herein.

Figure 5:
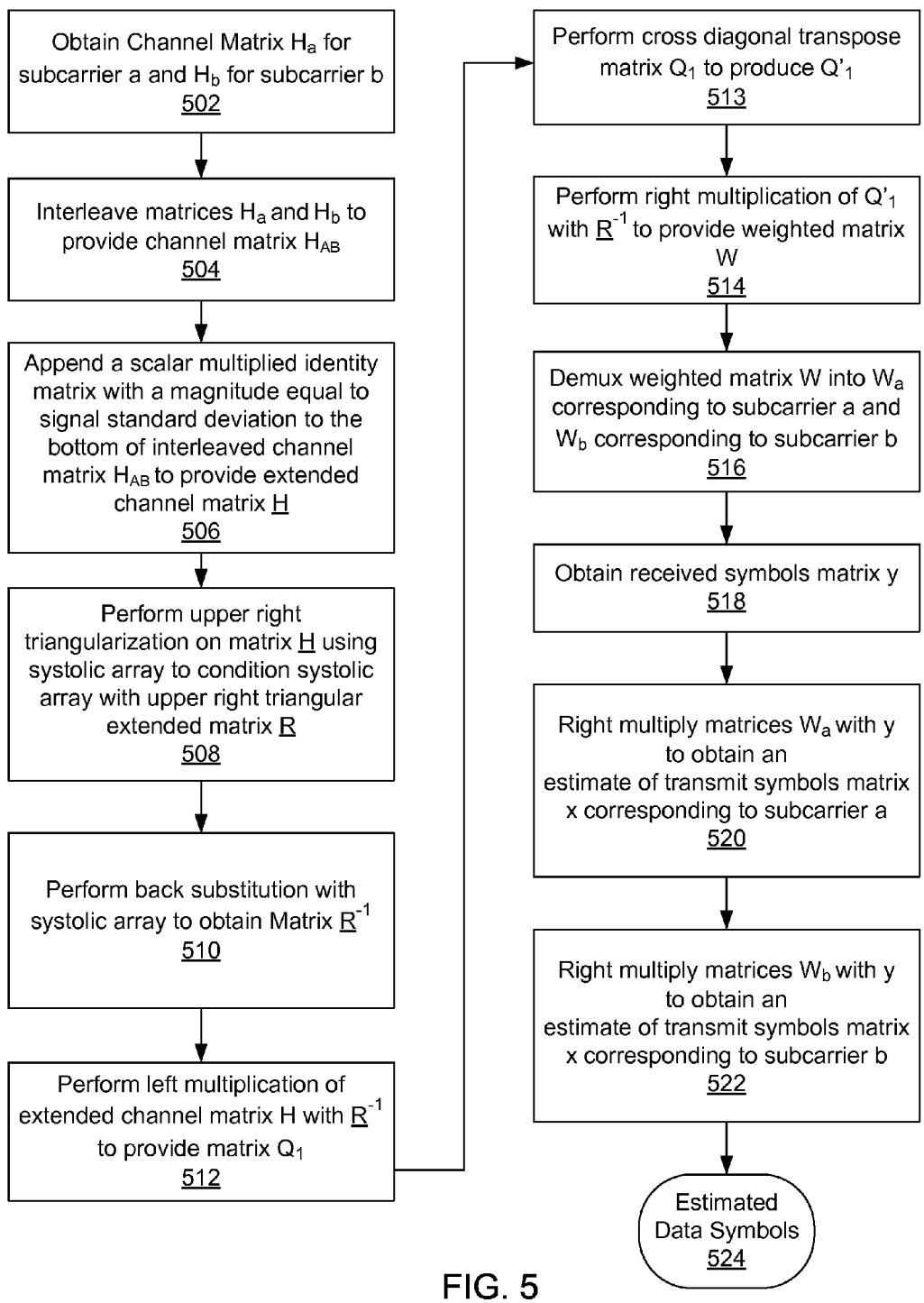
FIG. 5 illustrates a flowchart of a process to decode channel symbols of multiple subcarriers in a MIMO receiver in accordance with several embodiments of the invention.

FIG. 5 illustrates a flowchart of a process to decode channel symbols of multiple subcarriers in a MIMO receiver in accordance with several embodiments of the invention. Channel matrices $H_A$, corresponding to subcarrier A, and $H_B$, corresponding to subcarrier B, are received at step 502. Matrices $H_A$ and $H_B$ are interleaved to produce channel matrix $H_{AB}$ at step 504. A scalar-multiplied identity matrix with a magnitude determinant equal to signal standard deviation is appended to the bottom of matrix $H_{AB}$ at step 506 to produce extended channel matrix H.

Alternately, matrices $\overline{H}_A$ and $H_B$ may be separately processed at step 506 to produce extended channel matrices $H_A$ and $H_B$, which are then interleaved to produce extended channel matrix H.

Upper right triangularization is performed on the extended channel matrix H at step 508 using a systolic array, which conditions the systolic array with triangularized matrix R. Back-substitution is performed on R at step 510 to obtain inverted matrix $R^{-1}$. Left multiplication of extended channel matrix H with $R^{-1}$ is performed at step 512 to provide matrix $Q_1$. Cross diagonal transpose is performed on matrix $Q_1$ at step 513 to produce $Q'_1$. Right multiplication of $Q'_1$ with $R^{-1}$ is then performed to provide weighted matrix W at step 514.

Weighted matrix W is demultiplexed at step 516 into $W_A$ corresponding to subcarrier A and $W_B$ corresponding to subcarrier B. Received symbols matrix y is obtained at step 518 and right multiplied with matrix $W_A$ to obtain an estimate of transmit symbols matrix $X_A$ corresponding to subcarrier A at step 520, and right multiplied with matrix $W_B$ to obtain an estimate of transmit symbols matrix $X_B$ corresponding to subcarrier B at step 522. Estimated data symbols 524 are output from $X_A$ and $X_B$.

Figure 6:
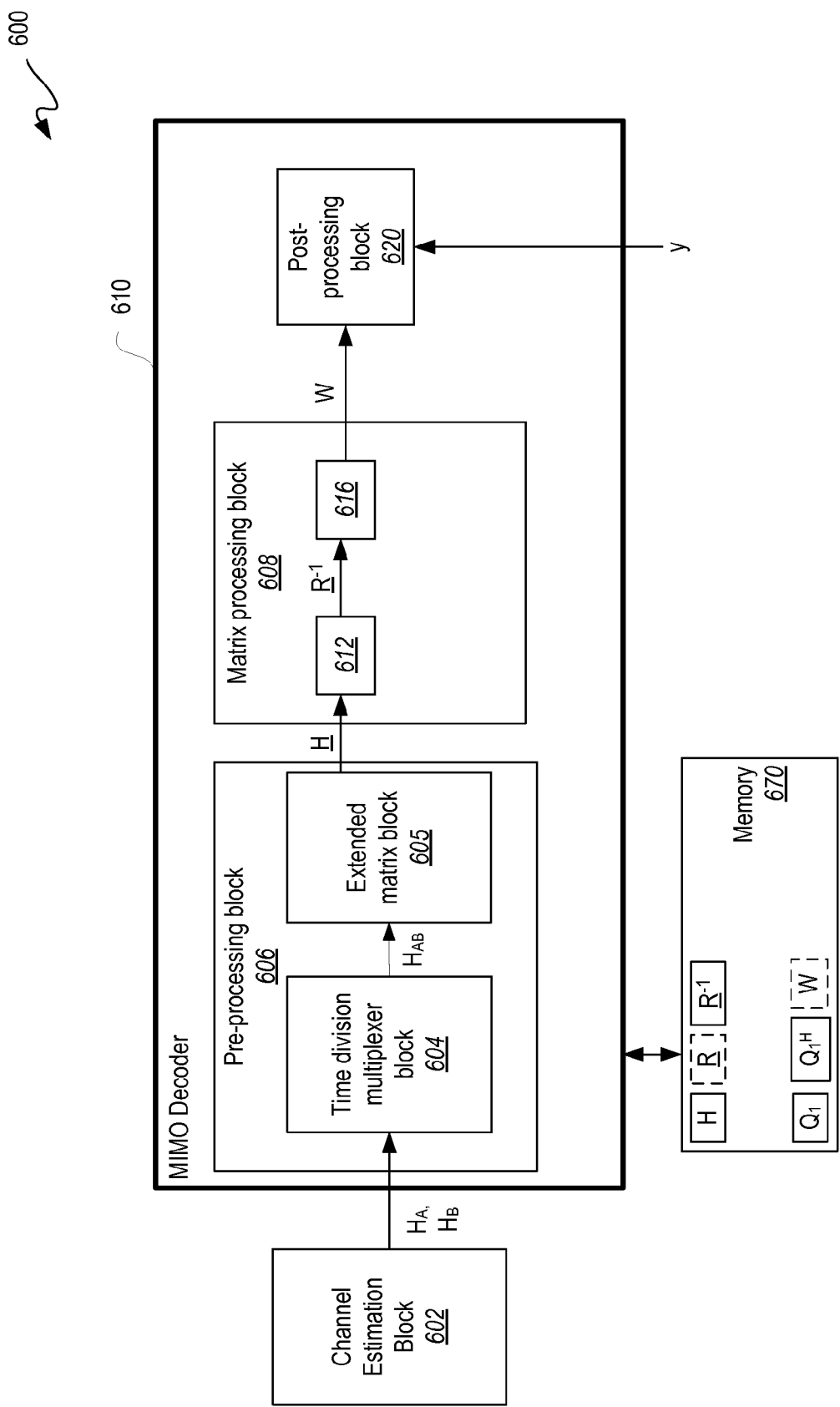
FIG. 6 shows a block diagram of a MIMO receiver configured to perform subcarrier grouping.

FIG. 6 is a block diagram of a MIMO receiver 600 including channel estimation block 602 and MIMO decoder 610. Channel estimation block 602 provides channel coefficients of each subcarrier, which may be organized in the form of a channel matrix H, to MIMO decoder 610. MIMO decoder 610 includes a preprocessing block 606, a matrix processing block 608, and post processing block 620. A memory unit 670 is coupled to MIMO decoder 610 and is used to store intermediate matrices produced during the decoding process. In this example implementation, pre-processing block 606 includes time division multiplexer block 604 and extended matrix block 605. The time division multiplexer block 604 groups subcarrier channel coefficients into an interleaved channel matrix $H_{AB}$. Matrix $H_{AB}$ is received by extended matrix block 606 which appends a scalar multiplied identity matrix with a magnitude determinant equal to signal standard deviation to the bottom of interleaved channel matrix $H_{AB}$ to provide an extended channel matrix $\underline{H}$ containing both subcarriers.

Matrix processing block performs the MMSE operation on the extended channel matrix to produce weighted matrix W. Matrix processing block 608 contains two systolic array blocks 612 and 616. Systolic array block 612 is configured to receive extended channel matrix H, perform triangularization, and back-substitution to produce matrix $R^{-1}$. Systolic array block 616 is configured to receive $R^{-1}$ and perform right and left multiplication with the original channel matrix $H_{AB}$ to produce the weighted matrix W. The post processing block demultiplexes the weighted matrix W into separate subcarriers and multiplies each by a symbol selection vector y to output an estimated symbol matrix X for each subcarrier.

Figure 7:
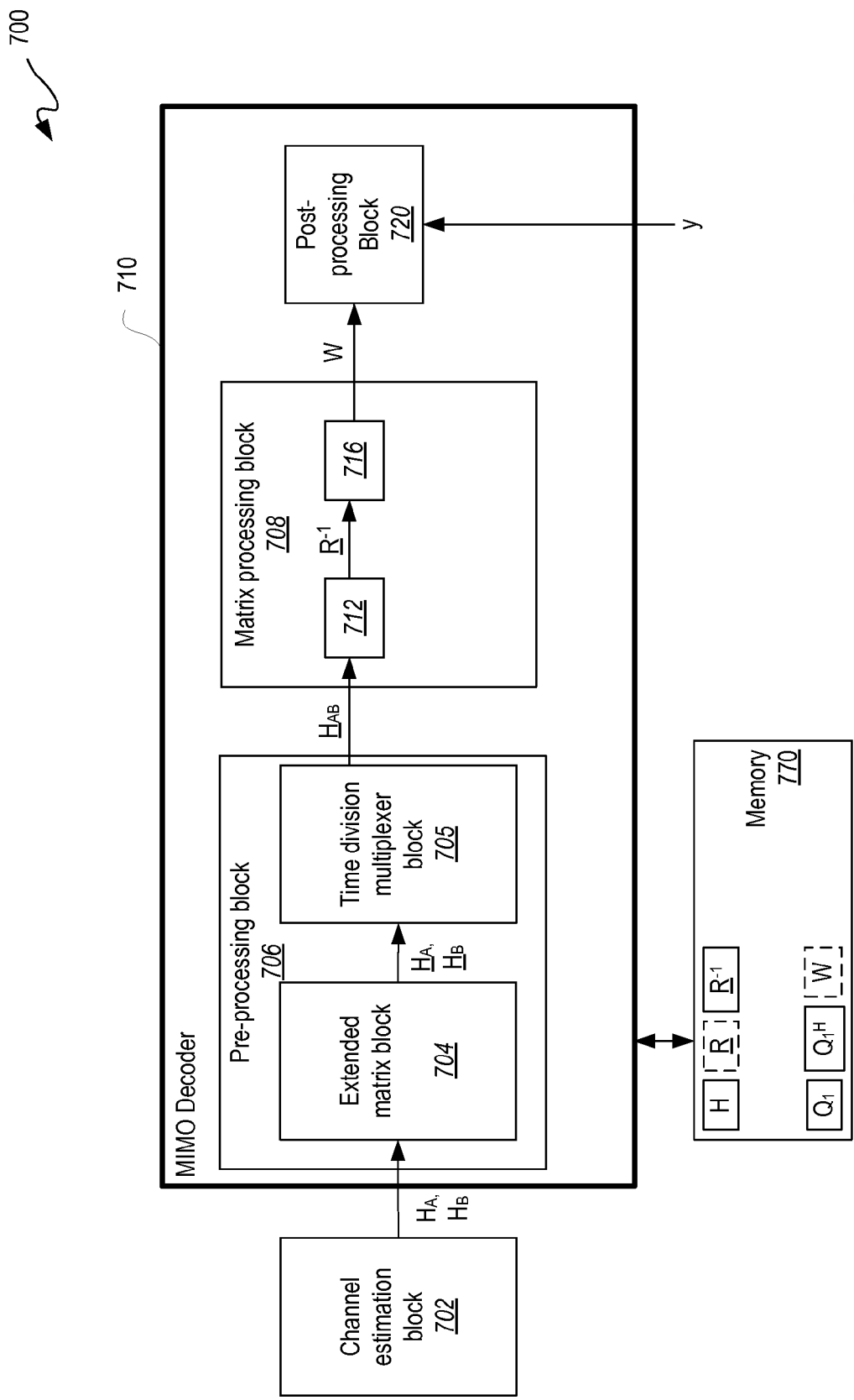
FIG. 7 shows a block diagram of a second example MIMO receiver configured to perform subcarrier grouping.

FIG. 7 shows a block diagram of a second example MIMO receiver 700 including a channel estimation block 702 and a MIMO decoder 710. Like the receiver shown in FIG. 6, channel estimation block 702 provides channel coefficients of each subcarrier to MIMO decoder 710, which may be organized in the form of a channel matrix H. MIMO decoder 710 includes a preprocessing block 706, a matrix processing block 708, and post processing block 720. A memory unit 770 is coupled to MIMO decoder 710 and is used to store intermediate matrices produced during the decoding process.

MIMO decoder 710 is different from that shown in FIG. 6 in that the channel matrix input to the decoder is constructed differently by the pre-processing block. In this example, extended matrix block 704, calculates the extended channel matrix for each subcarrier separately to produce $H_A$ and $H_B$. Time division multiplexer block 705 interleaves $\overline{H}_A$ and $\overline{H}_B$ using time division multiplexing to provide input matrix $\overline{H}_{AB}$ to matrix processing block 708. The time division multiplexing block may calculate $H_{AB}$ and store the matrix in memory or may interleave $H_A$ and $H_B$ as they are streamed into the matrix processing block. When $H_A$ and $H_B$ are interleaved while streaming, time division multiplexing block 705 may be implemented by a multiplexer configured to cycle through subcarrier inputs as matrix elements are received. It is understood that the time division multiplexer block of the preprocessing block may be performed by a single circuit or a plurality of preprocessing circuits corresponding to each input of the systolic array.

Matrix processing block 708 performs the MMSE operation on the interleaved input in a similar manner to the processing block of FIG. 6 to produce weighted matrix W. Matrix processing block 708 contains two systolic array blocks 712 and 716. Systolic array block 712 is configured to perform triangularization, and back-substitution to produce matrix $R^{-1}$. Systolic array block 716 is configured to receive $R^{-1}$, perform right and left multiplication with the original channel matrix $H_{AB}$ to produce the weighted matrix W. The post processing block demultiplexes the weighted matrix W into separate subcarriers and multiplies each by a symbol selection vector y to output an estimated symbol matrix x for each subcarrier.

Figure 8:
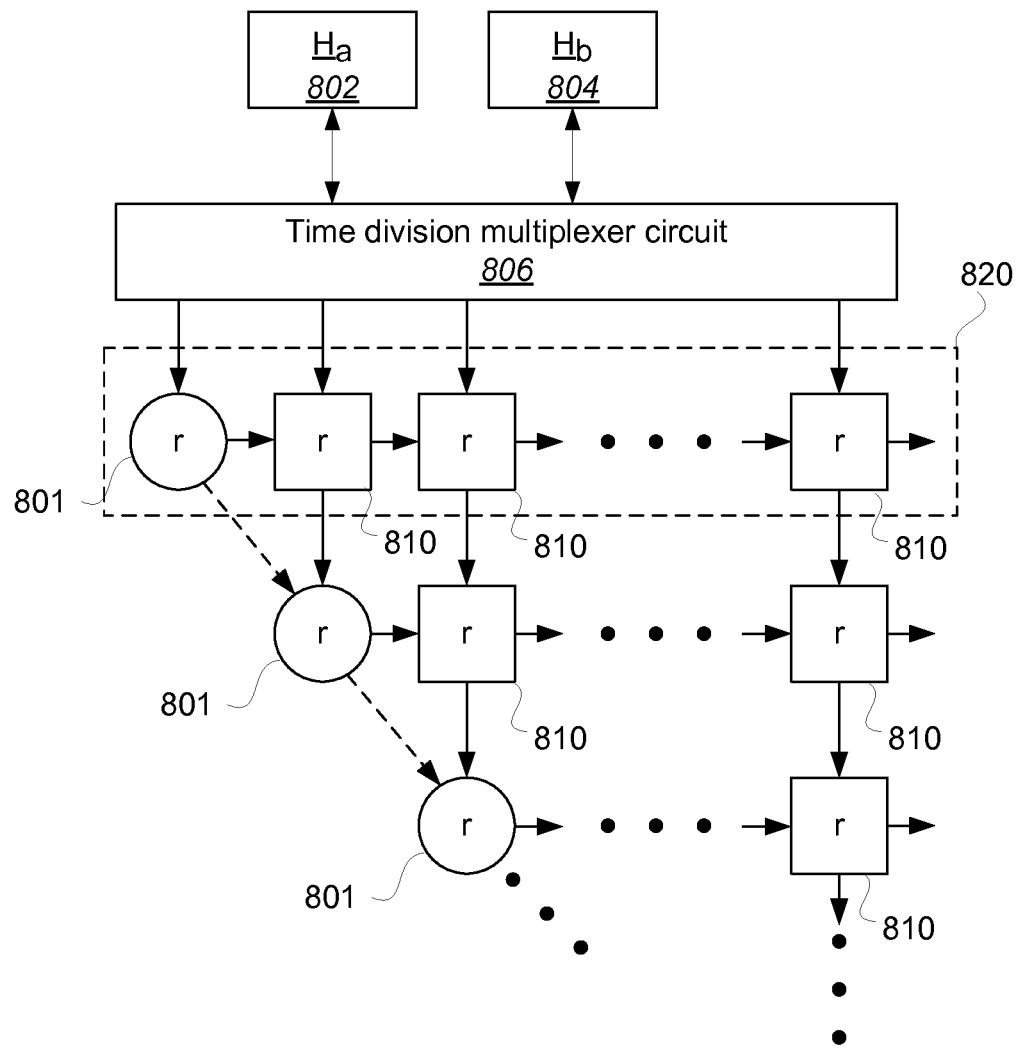
FIG. 8 is a block diagram of a systolic array with subcarrier selection circuit.

FIG. 8 is a block diagram of a subcarrier selection circuit connected to a systolic array. This example illustrates the operation of the channel selection circuit of FIG. 7. Time division multiplexer circuit 806 receives input from extended channel matrices of each subcarrier 802 and 804. Appropriate rows of the extended channel matrices are streamed as input to the input row of a systolic array 820 which includes a boundary cell and a subset of the internal cells. In an alternate configuration, a separate time division multiplexer circuit may be used for each input to the systolic array.

It should be appreciated that the matrix processing blocks shown in FIGS. 6 and 7 may be implemented with a one-by-one systolic array, namely a single boundary cell for multi-mode systolic array. Moreover, it should be understood that MIMO decoders 608 and 708 may be entirely implemented in a PLD, which may include implementing either or both memory, 670 and 770, and channel estimation block, 602 and 702, in such PLD.

Figure 9:
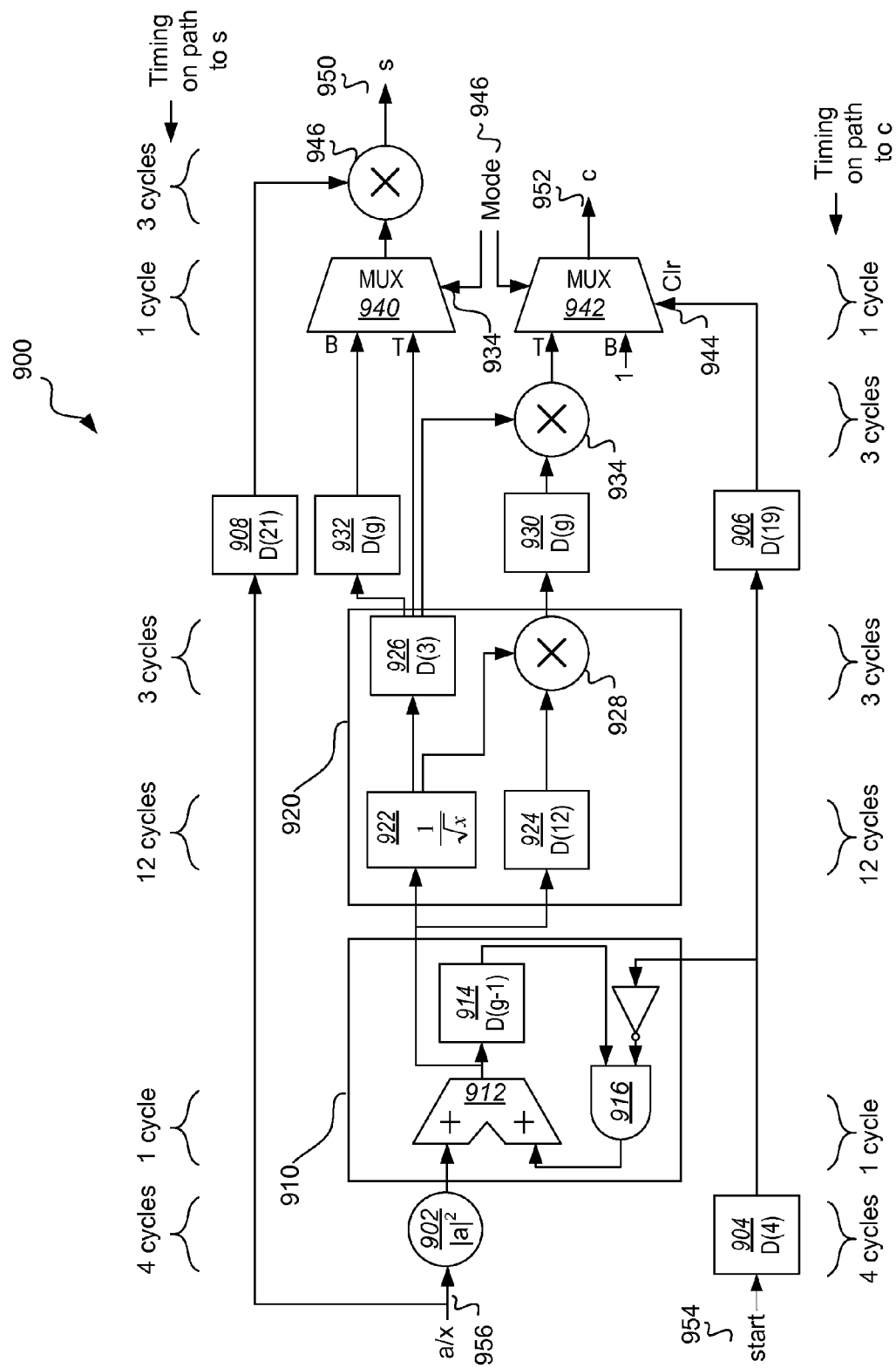
FIG. 9 is a block diagram of an example circuit for implementing a boundary cell of systolic array for performing triangularization and back-substitution in accordance with several embodiments of the invention.

FIG. 9 is a block diagram of a circuit depicting an exemplary embodiment of a processing cell that may be used for implementing the boundary cells of the first systolic array shown in FIG. 3-1. Boundary cell 900 is configured to operate in a first triangulation mode and a second back-substitution mode. While operating in the first mode, the boundary cell receives input $X_{in}$ to squared magnitude block 902 and delay 908.

The output of squared magnitude block is received by accumulator block 910. Accumulator block 910 includes an adder 912 having a first input coupled to receive input followed by a delay 914. The output of the delay 914 is looped back to an input of the adder 912. The size of the delay is chosen to be the number of time division multiplexed subcarriers, g, minus the number of clock cycles used by the adder. The output of the adder is output by the accumulator.

The output of accumulator block 910 is received by square root block 920. Square root block 920 calculates and outputs the square root and inverse square root of the output of accumulator 910. In the example implementation shown in FIG. 9, square root block includes a circuit 922 to calculate the inverse square root followed by a multiplication block 928 coupled to multiply the inverse square root by the received input to produce the square root of the input. Delays 924 and 926 are included to align the time division multiplexed data as it is processed. The amount of delay 924 is chosen to be the number of clock cycles used by inverse square root circuit 922. The amount of delay 926 is chosen to be the number of clock cycles used by multiplication block 928.

The outputs of square root block 920, are received by delays 930 and 932. These delays are used to store the outputs of square root block for processing the next set of time division multiplexed input elements. The current inverse square root output from delay 926 in square root block 920 is multiplied with the previous square root stored in delay 930 by multiplication block 934. The output produced by multiplication block 934 is forwarded to rotation factor c output 952 of the boundary cell by multiplexer block 942.

The current invert square root output by square root block 920 is selected for by multiplexer 940 for multiplication with input x 956 by multiplier block 946. The input x value used for multiplication comes from delay 908. The size of delay 908 is chosen to be the same as the number of clock cycles used by: squared magnitude block 902, accumulator 910, square root block 920, and multiplexer 940. In this example, delay 908 is set to 21 cycles. The result of multiplication block 946 is output on rotation factor s output 950.

Mode inputs 946 are used to set the boundary cell circuit to selectably operate the first or second modes. When the boundary cell operates in the second mode, multiplexer 942 selects a constant value of 1 for rotation factor c output 952, and multiplexer 940 selects the previous inverse square root value stored in delay 932 for multiplication by multiplier block 946. The result of multiplier block 946 is output on rotation factor s output 950.

When one set of time division multiplexed input has completed, stored values in delay circuits must be cleared so triangularization can be performed on the next set of time division multiplexed input. When the boundary cell switches from the second mode into the first mode, a start signal 954 is set to a high value for a number of clock cycles equal to the number of subcarriers grouped into each set of time division multiplexed input. Start signal 954 is delayed by delay 904 by the number of clock cycles used by squared magnitude block 902. The delayed signal is input into accumulator 910. While the start signal value is high, AND gate 916 will output a zero to the feedback input of adder 912. In this manner the previous accumulated values are canceled out. The start signal is also received and delayed by delay 906. The output of delay 906 is fed to a clear control port of multiplexer 942. While the start signal is set to a high value, the multiplexer is configured to output a value of zero as the c value 952 output by the boundary cell.

It is understood that delays may be implemented with fixed sized registers. Alternately, delays that have a delay value dependent on the number of subcarriers grouped in the time division multiplexed input may be implemented using programmable delays that may be configured by the systolic array to adjust the subcarrier grouping size.

Figure 10:
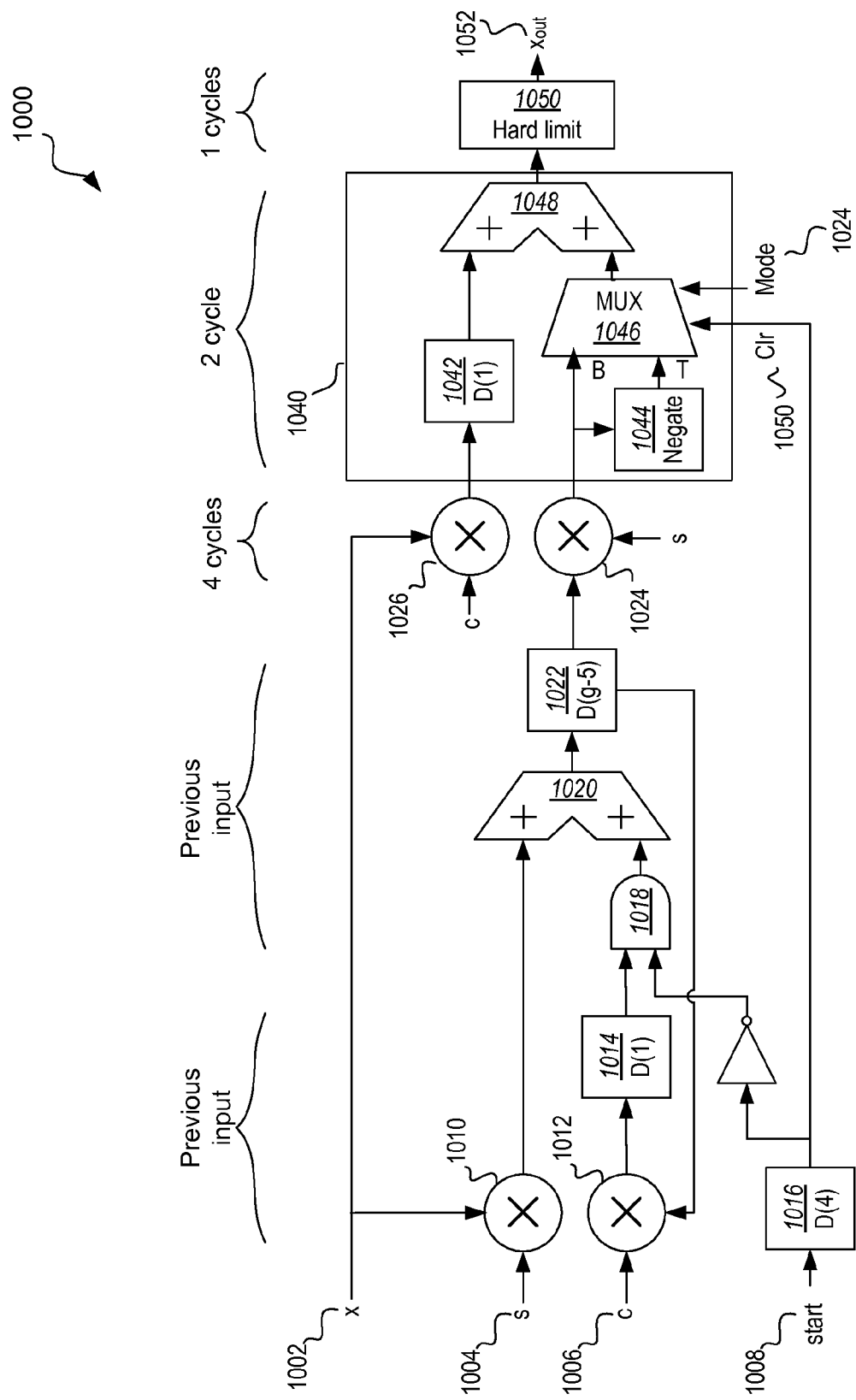
FIG. 10 is a block diagram of a circuit for implementing an internal cell of a systolic array for performing triangularization and back-substitution in accordance with several embodiments of the invention.

FIG. 10 is a circuit diagram depicting an exemplary embodiment of the internal cell shown in FIG. 3-2. Rotation factor inputs s 1004 and c 1006 to internal cell 1000 may be from another internal cell or a boundary cell. Furthermore, such rotation factor inputs s and c may be provided from internal cell 1000 to another internal cell. Input $X_{in}$ to internal cell 1000 may be an $X_{out}$ from another internal cell or $X_{in}$ data provided to a systolic array.

$X_{in}$ is provided as an input to multipliers 1010 and 1026. $X_{in}$ is multiplied by rotation factor s by multiplier block 1010. The output of multiplier 1010 is received by adder 1020 which is followed by delay 1022. The size of delay 1022 is chosen to be equal to the number of subcarriers grouped in each set of time multiplexed input minus the number of clock cycles needed by multiplier 1010 and adder 1020. The delayed output of delay 1022 is looped back and multiplied by rotation factor c by multiplication block 1012. It is noted that multiplication block 1012 multiplies real values and multiplier block 1010 multiplier complex values. In this example, multiplier 1010 takes one more than multiplier 1012. To align time multiplexed input elements, the output of multiplier 1012 is delayed one clock cycle by delay 1014. The delayed value of 1014 is received by adder 1020 and added to the output received from multiplier 1010.

The accumulated value in delay 1022 is multiplied by rotation factor s by multiplier block 1024. Rotation factor c is multiplied with $X_{in}$ by multiplier block 1026. The output of multipliers 1024 and 1026 is received by selectable addition/subtraction block 1040. When the internal cell is operating in a first triangulation mode, addition/subtraction block 1040 subtracts the output of multiplier 1024 from the output of multiplier 1026. When the internal cell is operating in a second back-substitution mode, addition/subtraction block 1040 adds the output of multiplier 1024 to the output of multiplier 1026. The output of addition/subtraction block 1040 is then rounded by hard limiter 1052 to produce $X_{out}$ 1052.

It should be understood that functionality described in a boundary cell computes a modified Givens rotation matrix and also may generate a residual value after applying rotation to an original vector. To apply rotation to other columns of a matrix, functionality of an internal cell is used.

For a MIMO decoder, latency requirements are defined by the 3GPP-LTE specification to be Ts (symbol period/1200 subcarriers)=1 msec/(12*1200). These specifications require a MIMO decoder to output a new MMSE solution every 69.44 ns (14.4 MHz).

For 4×2 channel matrices, 2×2 systolic arrays are required to handle the MMSE operations. For triangularization, the cells expect extended channel matrix input—6 rows of input for each sub-carrier, 4 of those from the original channel matrix, and the other two are sigma and 0. For 12 sub-carriers, a total of 12×6=72 input data elements enter in a TDM fashion, sub-carrier by sub-carrier, and then row-by-row.

The overall latency of the first systolic array is defined by the number of clock cycles needed to process a set time-division multiplexed input corresponding to the 12 subcarriers, before a second set of input can begin processing. Each boundary cell of the first systolic array has a latency of 24 clock cycles along the longest data path, as shown in FIG. 9. Internal cells of the first systolic array have a latency of 7 clock cycles. The latency of the first systolic array for a 4×2 channel matrices for 12 subcarriers is 24+7+24+72=127 clocks to complete the triangularization operation. Note that at this point, inverse square root values are stored in delay 932 shown in FIG. 9 and are ready at the S output of the boundary cells. The back-substitution operation can start right away since the required inverse square root values are available. It only requires an input of 12 ones to be pushed into the boundary cell 1, and 12 zeros to be pushed into the internal cell 1 to start the back-substitution operation and calculate an element of $R^{-1}$. It takes another 12 clock cycles to obtain all the outputs from the back-substitution. However, once the first element of $R^{-1}$ is available, a second systolic array can start processing to perform left and right multiplications, which means another set of 12 sub-carriers can enter the first array. This only requires one extra clock cycle. Overall, for a 4×2 system, the latency for the first systolic array is 128 clock cycles. For a 2×2 system, the latency for the first systolic array is 104 clock cycles.

Figure 11:
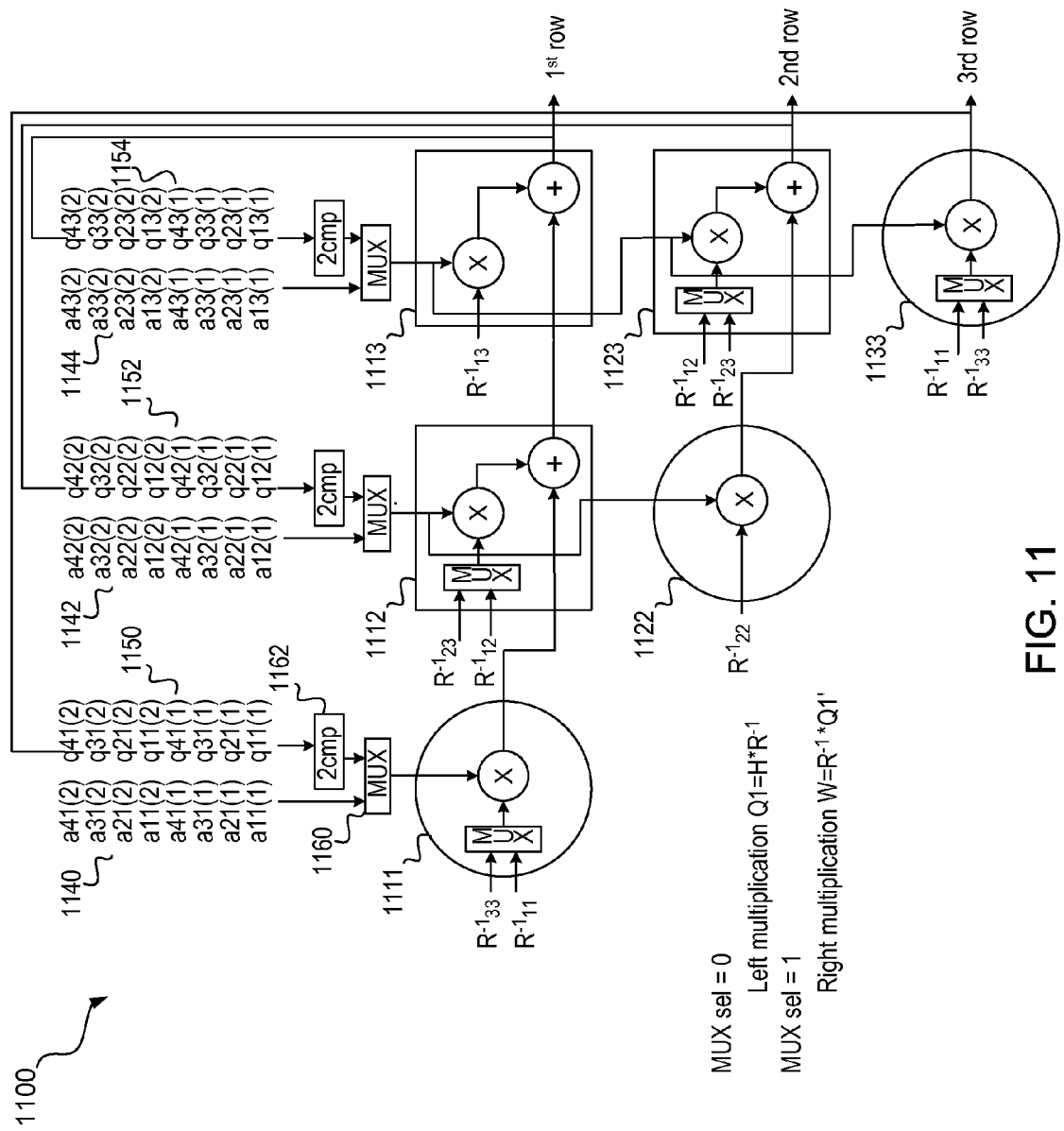
FIG. 11 is a block diagram of an example implementation of a systolic array for performing left multiplication, right multiplication, and cross diagonal transposition in accordance with several embodiments of the invention.

FIG. 11 is a block diagram of an example systolic array for performing left multiplication, cross diagonal transposition, and right multiplication in accordance with several embodiments of the invention. The example systolic array comprises boundary cells such as 1111, 1122, and 1133 and internal cells 1112, 1113, and 1123. The systolic array is configured to operate in a first mode for performing left multiplication and a second mode for right multiplication. Left multiplication of a matrix A with matrix B to produce product AB is sometimes referred to as post-multiplication of A with B or pre-multiplication of B with A, and such terms are used interchangeably herein.

While operating in the first mode, left multiplication is performed by multiplying each element in a row L of matrix $R^{-1}$ with respective elements in column L of matrix channel matrix H. Boundary cells calculate the product of the two elements and output the result to the adjoining internal cell in the same row of the systolic array. Internal cells additionally receive output from the preceding processing cell in the same row in the systolic array. Internal cells calculate the product of received elements of matrix $R^{-1}$ and H and output a sum of the product and the received output from the preceding processing cell. The last processing cell in each row of the systolic array outputs a row of matrix Q.

While operating in the second mode, the processing cells are configured to perform right multiplication of matrix $R^{-1}$ with matrix Q. It is noted that the product of left multiplication, $R^{-1}Q$, is not necessarily the same as the product of right multiplication, $QR^{-1}$. The systolic array performs right multiplication by performing left multiplication in combination with cross diagonal transposition of the matrices. Cross-diagonal transposition of an N×N matrix T having rows M and columns L, indicated as T', essentially switches the columns and rows such that $T_{M,L}=T'_{(N-L+1),(N-M+1)}$. The product of cross diagonal transposition is given by the equivalence, $$(QR^{-1})'=R^{-1'}Q',$$

$$QR^{-1}=(R^{-1'}Q')'.$$

The systolic array uses this equivalence to perform right multiplication by performing left multiplication of the cross diagonal transposition of the matrices.

While operating in the second mode, a multiplexor of each processing cell selects input from $R^{-1'}$. Input selections circuits 1160 and 1162 of each column are configured to select input from signal lines arranged to input Q' 1150, 1152, and 1154 when operating in the second mode. Left multiplication is then performed by the processing cells in a manner similar to that performed while operating in the first mode.

The simplified operation requires three and four clock cycles of latency for each boundary cell and internal cell, respectively. Unlike the first systolic array for performing triangularization and back-substitution, this array does not require any feedback loop. Thus, it is easier to operate this array on each sub-carrier and complete all the multiplications for a particular subcarrier and start processing elements of the next subcarrier. Alternately, each processing cell may contain delay elements for storing the product of each subcarrier in order to process the output of the first systolic array in a time division multiplexed fashion.

For either right or left multiplication, it takes three cycles to load the systolic array with the corresponding multipliers. In this array, the data only flows to the right, so the array latency is 3+4=7 cycles. The cross diagonal transpose takes 16 clocks, however, this does not contribute to the overall latency of the second systolic array since this is only a memory mapping and data address manipulation in hardware and can be processed in parallel with the multiplications. The overall latency of the second systolic array for a 4×2 system, is 2*(3+7+4*12)=116 clock cycles. For a 2×2 system, the latency is 2*(3+7+2*12)=68 clock cycles.

Figure 12:
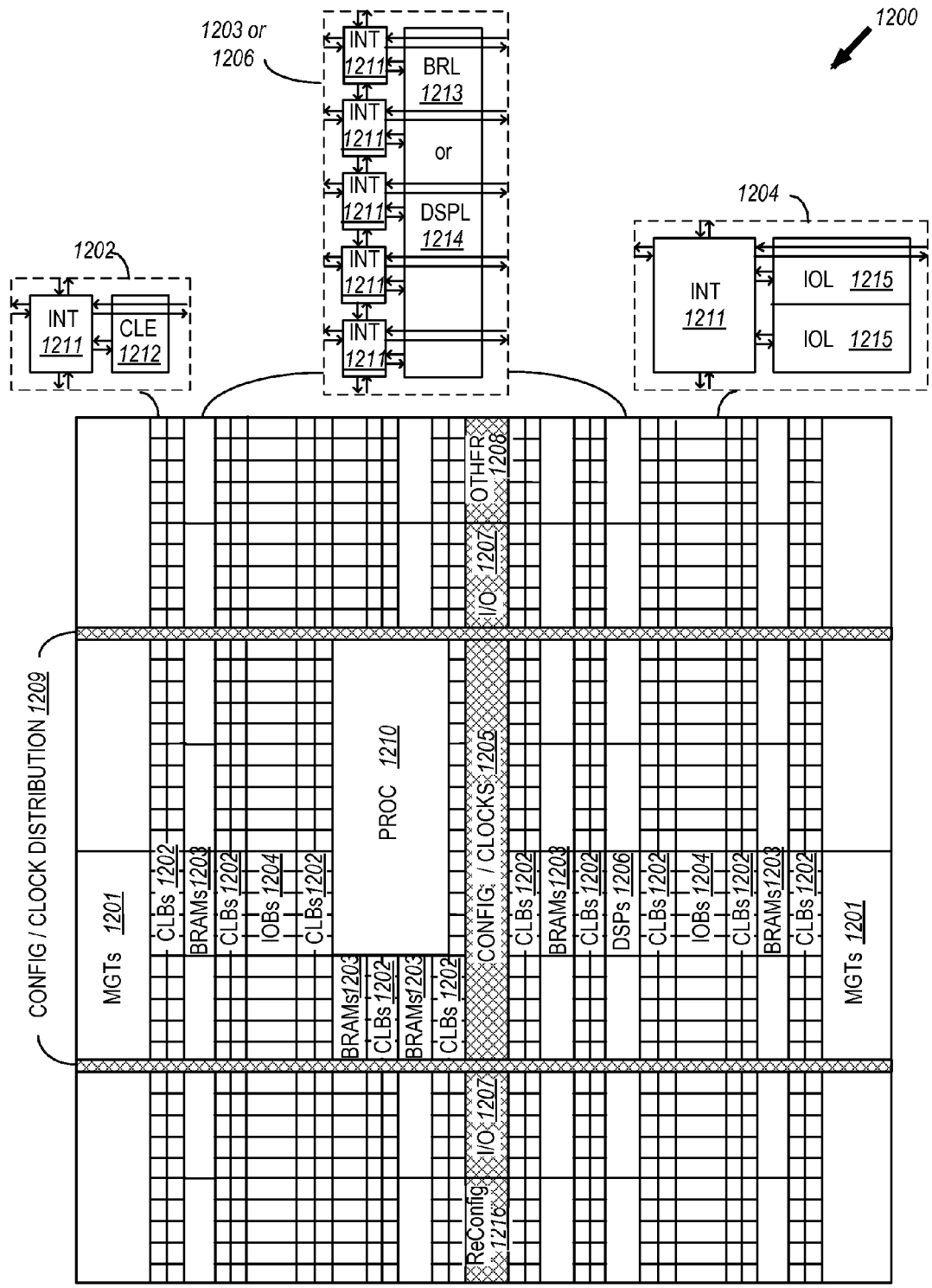
FIG. 12 is a block diagram of a programmable integrated circuit which may be configured to implement a MIMO decoder with subcarrier grouping in accordance several embodiments of the invention.

FIG. 12 is a block diagram of a programmable integrated circuit, specifically a Field Programmable Gate Array or FPGA, which may be configured to implement systolic array circuits in accordance with one or more embodiments of the invention. FPGAs and other programmable integrated circuits can include several different types of programmable logic blocks in the array. For example, FIG. 12 illustrates an FPGA architecture (1200) that includes a large number of different programmable tiles including multi-gigabit transceivers (MGTs 1201), configurable logic blocks (CLBs 1202), random access memory blocks (BRAMs 1203), input/output blocks (IOBs 1204), configuration and clocking logic (CONFIG/CLOCKS 1205), digital signal processing blocks (DSPs 1206), a reconfiguration port (RECONFIG 1216), specialized input/output blocks (I/O 1207), for example, clock ports, and other programmable logic 1208 such as digital clock managers, analog-to-digital converters, system monitoring logic, and so forth. Some FPGAs also include dedicated processor blocks (PROC 1210).

In some FPGAs, each programmable tile includes a programmable interconnect element (INT 1211) having standardized connections to and from a corresponding interconnect element in each adjacent tile. Therefore, the programmable interconnect elements taken together implement the programmable interconnect structure for the illustrated FPGA. The programmable interconnect element INT 1211 also includes the connections to and from the programmable logic element within the same tile, as shown by the examples included at the top of FIG. 12.

For example, a CLB 1202 can include a configurable logic element CLE 1212 that can be programmed to implement user logic plus a single programmable interconnect element INT 1211. A BRAM 1203 can include a BRAM logic element (BRL 1213) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 1206 can include a DSP logic element (DSPL 1214) in addition to an appropriate number of programmable interconnect elements. An 10B 1204 can include, for example, two instances of an input/output logic element (IOL 1215) in addition to one instance of the programmable interconnect element INT 1211. As will be clear to those of skill in the art, the actual I/O pads connected, for example, to the I/O logic element 1215 are manufactured using metal layered above the various illustrated logic blocks, and typically are not confined to the area of the input/output logic element 1215.

In the pictured embodiment, a columnar area near the center of the die (shown shaded in FIG. 12) is used for configuration, clock, and other control logic. Horizontal areas 1209 extending from this column are used to distribute the clocks and configuration signals across the breadth of the FPGA.

Some FPGAs utilizing the architecture illustrated in FIG. 12 include additional logic blocks that disrupt the regular columnar structure making up a large part of the FPGA. The additional logic blocks can be programmable blocks and/or dedicated logic. For example, the processor block PROC 1210 shown in FIG. 12 spans several columns of CLBs and BRAMs.

Note that FIG. 12 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 12 are purely exemplary. For example, in an actual FPGA more than one adjacent column of CLBs is typically included wherever the CLBs appear, to facilitate the efficient implementation of user logic.

The present invention is thought to be applicable to a variety of systolic arrays configured for MIMO decoding. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A minimum mean square error equalization processor, comprising:
a first systolic array configured to operate in first and second modes and receive an input set of time division multiplexed matrices from a plurality of channel matrices;
wherein the first systolic array operating in the first mode performs triangularization on the input set of matrices to produce a first set of time division multiplexed output matrices, and operating in the second mode performs back-substitution on the first set to produce and output a second set of time division multiplexed output matrices;
a second systolic array configured to operate in first and second modes and receive the second set of matrices from the first systolic array and the input set of matrices;
wherein the second systolic array operating in the first mode performs left multiplication on the second set of matrices with the input set of matrices to produce a third set of time division multiplexed output matrices;
wherein the second systolic array operating in the second mode:
performs cross diagonal transposition on the third set of matrices to produce a fourth set of time division multiplexed output matrices; and
performs right multiplication on the second set of matrices with the fourth set of matrices to produce a fifth set of time division multiplexed output matrices;
wherein a set of outputs of the first systolic array is coupled to a first set of corresponding inputs of the second systolic array; and
wherein the first systolic array is configured to switch from the first mode to the second mode after triangularization is completed, and the second systolic array is configured to switch from the first mode to the second mode after left multiplication is completed.

2. The processor of claim 1, wherein:
a set of outputs of the first systolic array is coupled to a second set of corresponding inputs of the second systolic array, wherein a cross diagonal transposition of the set of outputs is provided to the second set of corresponding inputs;
while the second systolic array is operating in the first mode, the performing of left multiplication includes performing left multiplication using the second set of output matrices; and
while the second systolic array is operating in the second mode, the performing of right multiplication includes performing left multiplication using the cross diagonal transposition of the second set of output matrices.

3. The processor of claim 1, wherein the second systolic array includes:
an input selection circuit having a set of outputs coupled to a second set of inputs of the second systolic array, a first set of inputs coupled to the input set of matrices, and a second set of inputs coupled to a set of outputs of the second systolic array; and
wherein:
while the second systolic array is operating in the first mode, the input selection circuit receives and outputs the input set of matrices received on the first set of inputs of the selection circuit to the second set of inputs of the systolic array; and
while the second systolic array is operating in the second mode, the input selection circuit receives and outputs the cross diagonal transposition of the third set of matrices from the second set of inputs of the selection circuit to the second set of inputs of the systolic array.

4. The processor of claim 1, wherein the latency of each array is less than or equal to 128 clock cycles.

5. The processor of claim 1, wherein the first systolic array includes:
a plurality of processing cells, including boundary cells and internal cells, the processing cells arranged into:
N rows of processing cells, each row M beginning with a boundary cell and continuing with a number of internal cells equal to N minus M, wherein $1 \leq M \leq N$; and N columns of processing cells, each column L containing L minus one internal cells followed by one boundary cell, wherein $1 \leq L \leq N$;

wherein:

the first systolic array is configured to receive and process time division multiplexed input of elements of a plurality of channel matrices;

the boundary and internal cells are configurable to operate in first and second modes;

while operating in the first mode the boundary cells:

determine and output first and second rotation factors to the next processing cell in the row occupied by the boundary cell for each input element corresponding to a channel matrix in the plurality of channel matrices; and determine a multiplicative inverse of an accumulated value of a squared magnitude of the input elements corresponding to each channel matrix;

while operating in the second mode the boundary cells:

output a first rotation factor equal to a value of one; and output a second rotation factor equal to the multiplicative inverse multiplied by the input element; and the internal cells are configured to:

receive and output the first and second rotation factors; and for each input element corresponding to a channel matrix in the plurality of channel matrices:

determine and store a first value equal to the input element multiplied by the second rotation factor and added to the first rotation factors multiplied by a stored first value of a preceding input element corresponding to the channel matrix;

multiply the first value by the second rotation factor to produce a second value;

multiply the input element by the first rotation factor to produce a third value;

while operating in the first mode, output the third value added to the second value; and while operating in the second mode, output the second value subtracted from the third value.

6. The processor of claim 5, wherein in the determining of the first and second rotation factors each boundary cell is further configured to:

for each input element corresponding to a channel matrix in the plurality of channel matrices:

determine a squared magnitude of each input element received;

add the determined squared magnitude to an accumulated value of the squared magnitudes of the inputs corresponding to the channel matrix;

determine and store the square root and inverse square root of the accumulated value;

multiply the determined inverse square root by a square root of the accumulated value corresponding to a previous input element of the same respective channel matrix as the input element to determine the first rotation factor; and multiply the determined inverse square root by the input element to determine the second rotation factor.

7. The processor of claim 6, wherein the first systolic array operating in the first mode clears the accumulated value in response to entering the first mode from the second mode.

8. The processor of claim 5, wherein the boundary cells include:

a squared magnitude circuit;

an accumulator circuit having a first input coupled to the output of the squared magnitude circuit;

a square root circuit having an input coupled to the output of the accumulator circuit, the square root circuit configured to produce a square root of a value from the input at a first output and produce an inverse square root of the value from the input at a second output;

a first register having an input coupled to the first output of the square root circuit;

a second register having an input coupled to the second output of the square root circuit;

a first multiplier having a first input coupled to an output of the first register and a second input coupled to the second output of the square root circuit;

a first selection circuit having a first input coupled to an output of the first multiplier and a second input coupled to receive a constant value equal to one, wherein the first selection circuit is configured to output the value of the first input while operating in the first mode, and output the value of the second input while operating in the second mode;

a second selection circuit having a first input coupled to the second output of the square root circuit and a second input coupled to an output of the second register, wherein the second selection circuit is configured to output the value of the first input while operating in the first mode, and output the value of the second input while operating in the second mode;

a third register having an input coupled to the input of the squared magnitude circuit a second multiplier having a first input coupled to an output of the second selection circuit and a second input coupled to an output of the third register.

9. The processor of claim 8, wherein:

the third register is configured to store a number of values equal to a number of cycles needed to complete a data path through the squared magnitude circuit, the accumulator circuit, the square root circuit, and the second selection circuit; and the first and second registers are configured to store a number of values equal to the number of channel matrices in the plurality of channel matrices.

10. The processor of claim 8, wherein the accumulator circuit includes:

an adder having a first input coupled to the input of the accumulator circuit;

a fourth register having an input coupled to an output of the adder and an output coupled to a second input of the adder; and wherein:

the squared magnitude circuit includes a plurality of data paths; and the fourth register is configured to store a number of values equal to the number of channel matrices in the plurality of channel matrices minus a number of cycles needed to complete a longest data path through the squared magnitude circuit and the adder.

11. The processor of claim 8, wherein the square root circuit includes:

an inverse square root circuit having an input coupled to the input of the square root circuit;

a fourth register having an input coupled to the input of the square root circuit;

a fifth register having an input coupled to an output of the inverse square root circuit and an output coupled to the second output of the square root circuit;

a multiplier having a first input coupled to an output of the fourth register and a second input coupled to the output of the inverse square root circuit;

wherein:
the inverse square root circuit includes a plurality of data paths;
the multiplier includes a plurality of data paths;
the fourth register is configured to store a number of values equal to a number of cycles needed to complete the longest of the data paths through the inverse square root circuit; and
the fifth register is configured to store a number of values equal to a number of cycles needed to complete the longest of the data paths through the multiplier.

12. The processor of claim 8, wherein the square root circuit includes:
a square root block having an input coupled to the input of the square root circuit;
a fourth register having an input coupled to the output of the square root block;
a multiplicative inverse circuit coupled to the output of the square root block; and
wherein:
the multiplicative inverse circuit includes a plurality of data paths; and
the fourth register is configured to store a number of values equal to the number of cycles needed to complete the longest of the data paths through the multiplicative inverse circuit.

13. The processor of claim 5, wherein internal cells include:
a first multiplier having a first input for receiving the second rotation factor and a second input for receiving an input element;
a second multiplier having a first input for receiving the first rotation factor;
a first adder having a first input coupled to an output of the first multiplier and a second input coupled to an output of the second multiplier;
a first register having an input coupled to an output of the first adder and an output coupled to a second input of the second multiplier;
a third multiplier having a first input coupled to the second input of the first multiplier and a second input coupled to the first input of the second multiplier;
a fourth multiplier having a first input coupled to the output of the first register and a second input coupled to the input of the first input of the first multiplier; and
a selectable adder-subtractor circuit having a first input coupled to an output of the third multiplier and a second input coupled to an output of the fourth multiplier.

14. The processor of claim 13, wherein:
the first adder includes a plurality of data paths;
the first multiplier includes a plurality of data paths;
the first register is configured to store a number of values equal to the number of channel matrices in the plurality of channel matrices minus a number of clock cycles needed to complete the longest of the data paths through the first multiplier and the first adder.

15. The processor of claim 5, wherein a latency of the first systolic array is less than or equal to 128 clock cycles for channel matrices of 4×2 input elements.

16. The processor of claim 5, wherein a latency of the first systolic array is less than or equal to 104 clock cycles for channel matrices of 2×2 input elements.

17. The processor of claim 1, wherein the second systolic array includes:
a plurality of processing cells, including boundary cells and internal cells, and arranged into:
N rows of processing cells, each row M beginning with a boundary cell and continuing with a number of internal cells equal to the number N minus M, wherein $1 \leq M \leq N$; and
N columns of processing cells, each column L containing L minus one internal cells followed by one boundary cell, wherein $1 \leq L \leq N$;
wherein:
the second systolic array is configurable to operate in a first mode and a second mode;
while operating in the first mode, processing cells of the second systolic array are configured and interconnected to receive first and second input matrices and perform left multiplication of the first input matrix with the second input matrix to produce a first output matrix;
while operating in the second mode:
processing cells of the second systolic array are configured and interconnected to produce a cross diagonal transposition on the first output matrix; and
perform right multiplication of the cross diagonal transposition of the first output matrix with the first input matrix to produce a second output matrix.

18. The processor of claim 17, wherein:
each boundary cell includes:
a first input selector circuit for receiving elements of the first input matrix; and
a multiplier having a first input connected to an output of the first input selector circuit and a second input for receiving elements of a second matrix; and
each internal cell includes:
a second input selector circuit for receiving elements of the first input matrix;
a multiplier having a first input connected to an output of the second input selector circuit and a second input for receiving elements of a second matrix;
an adder having one input connected to an output of the multiplier and one input for receiving an output of the processing cell in the preceding column of the same row of the second systolic array occupied by the each internal cell; and
wherein, the second input selector circuit is configured to output elements of the first input matrix while operating in the first mode, and output elements of the cross diagonal transposition of the first matrix while operating in the second mode.

19. The processor of claim 17, further comprising:
an input selection circuit for each column, L, the input selection circuit having:
an output coupled to an input of the processing cell in row 1 and column L of the second systolic array;
a first input for receiving input from the first input matrix; and
a second input coupled to an output of the row of the second systolic array having a row index equal to the value of N minus L;

wherein:
while operating in the first mode, the input selection circuit outputs each value received at the first input; and
while operating in the second mode, the input selection circuit:
produces a 2's complement of each value received at the second input; and
outputs the 2's complement of each value.

20. A method for minimum mean square error equalization, comprising:
receiving an input set of time division multiplexed matrices from a plurality of channel matrices by a first systolic array;
while operating in a first mode, performing triangularization by the first systolic array on the input set of matrices to produce a first set of time division multiplexed output matrices;
while operating in a second mode, performing back-substitution by the first systolic array on the first set to produce and output a second set of time division multiplexed output matrices;
receiving the second set of matrices from the first systolic array by and receiving the input set of matrices by a second systolic array;
while operating in the first mode, performing left multiplication by the second systolic array on the second set of matrices with the input set of matrices to produce a third set of time division multiplexed output matrices;
while operating in the second mode, the second systolic array:
performing cross diagonal transposition on the third set of matrices to produce a fourth set of time division multiplexed output matrices; and
performing right multiplication on the second set of matrices with the fourth set of matrices to produce a fifth set of time division multiplexed output matrices; and
switching the first systolic array from the first mode to the second mode after triangularization is completed, and switching the second systolic array from the first mode to the second mode after left multiplication is completed.

* * * * *